United States Patent [19]
Kintz

[11] Patent Number: 5,775,765
[45] Date of Patent: Jul. 7, 1998

[54] TRUCK BED TARP AND STORING SYSTEM

[76] Inventor: Robert A. Kintz, 301-A White St., Weissport, Pa. 18235

[21] Appl. No.: 701,653

[22] Filed: Aug. 26, 1996

[51] Int. Cl.⁶ .................................................. B60P 7/04
[52] U.S. Cl. .................................... 296/98; 160/23.1
[58] Field of Search .................. 296/98, 100; 160/23.1

[56] References Cited

U.S. PATENT DOCUMENTS

| | | | |
|---|---|---|---|
| 3,146,824 | 9/1964 | Veilleux | 296/98 X |
| 4,272,119 | 6/1981 | Adams | 296/100 |
| 5,423,588 | 6/1995 | Eglinton | 296/98 |

*Primary Examiner*—Andrew C. Pike

[57] ABSTRACT

A truck bed tarp and storing system includes a housing unit that has a bottom side, a top side, a front edge with a slot, and a hollow between the two. The bottom side of the housing unit has a pair of brackets that are coupled to a forward portion of a truck bed of a pickup truck. Also, a roller mechanism is mounted within the hollow of the housing unit. The roller mechanism has a roller and an axle. Included is a tarp that has a first end attached to the roller. The tarp has a second end that extends through the second slot and a middle portion. A spring is disposed about the axle and interior of the housing unit. Lastly, the tarp is deployed off the roller within the housing by pulling the second end of the tarp out and over the truck bed. The tarp is secured to a pair of side walls of the truck.

9 Claims, 3 Drawing Sheets

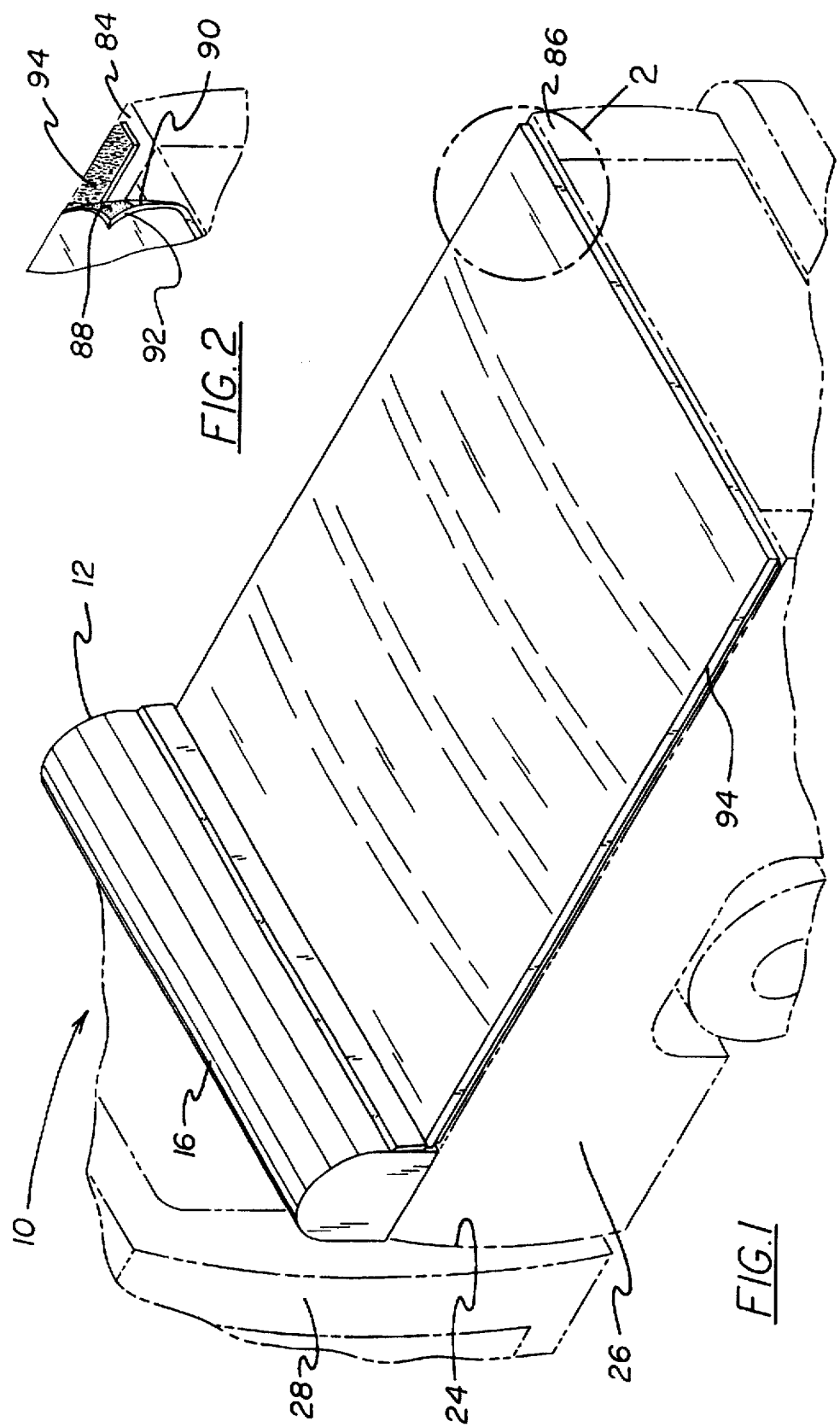

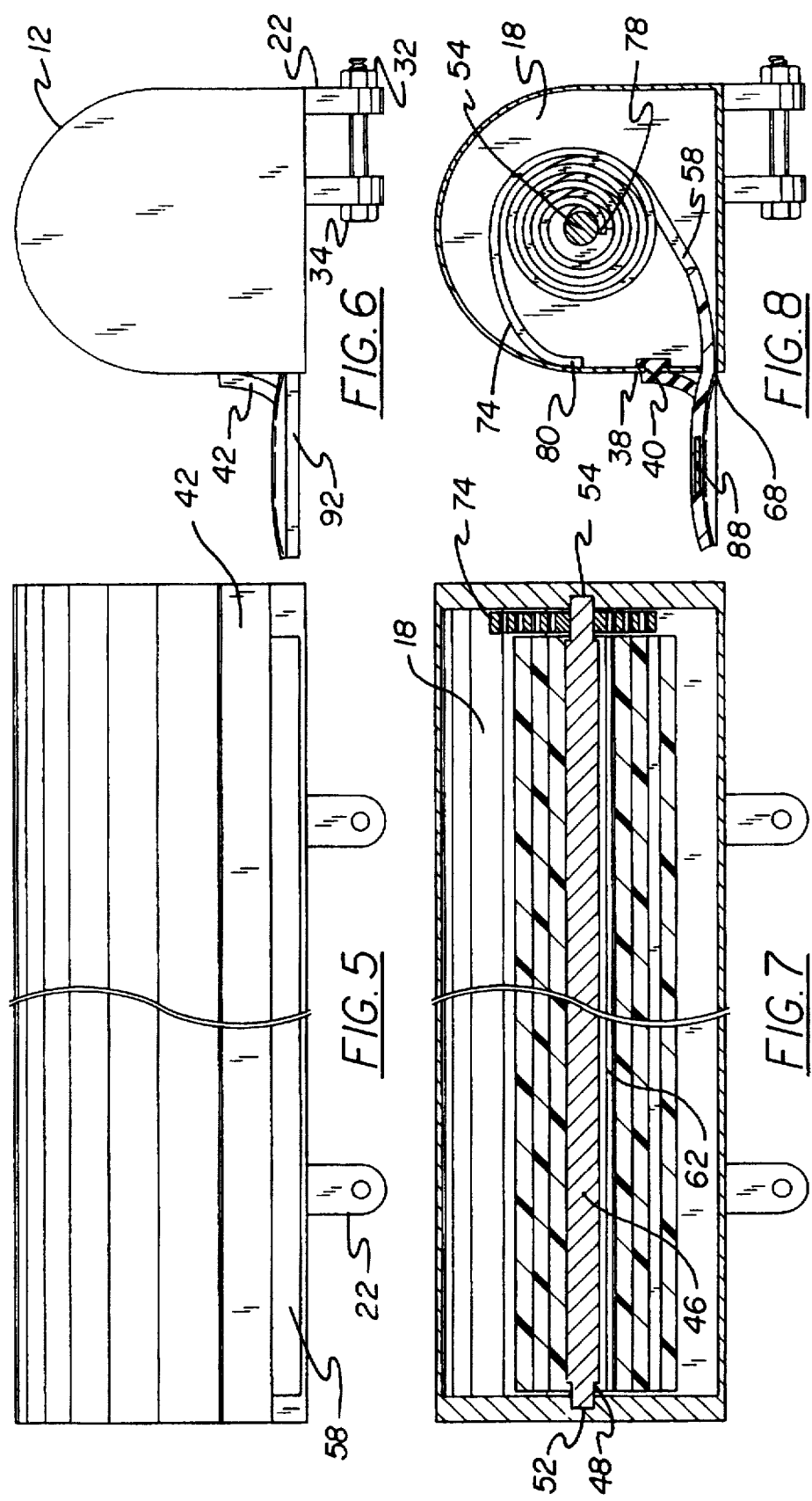

TRUCK BED TARP AND STORING SYSTEM

BACKGROUND OF THE INVENTION

1. Field of the Invention

The present invention relates to a truck bed tarp and storing system and more particularly pertains to providing a protective truck bed tarp for a pickup truck that has a housing unit attached to the rear of the truck bed.

2. Description of the Prior Art

The use of truck tarpaulins is known in the prior art. More specifically, truck tarpaulins heretofore devised and utilized for the purpose of truck bed covers are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,328,228 to Klassen discloses a cover for truck bed and cargo. U.S. Pat. No. 5,186,231 to Lewis discloses a tarpaulin deployment and retraction apparatus. U.S. Pat. No. 5,058,956 to Godwin, Sr. discloses a hydraulically actuated tarp extension and retraction system for a dump truck. U.S. Pat. No. 4,023,857 to Killion discloses a tensioned and retractable truck body tarpaulin. Lastly, U.S. Pat. No. 4,050,734 to Richard discloses a roll-up truck cover assembly.

While these devices fulfill their respective, particular objectives and requirements, the aforementioned patents do not describe truck bed tarp and storing system that allows a tarp, for the truck bed of a pickup truck, to have a housing unit that is attached to the rear of the truck bed containing the tarp, and allowing the tarp to be deployed and rewound from within the housing unit.

In this respect, the truck bed tarp and storing system according to the present invention substantially departs from the conventional concepts and designs of the prior art, and in doing so provides an apparatus primarily developed for the purpose of providing a protective truck bed tarp for a pickup truck that has a housing unit attached to the rear of the truck bed.

Therefore, it can be appreciated that there exists a continuing need for a new and improved truck bed tarp and storing system which can be used for providing a protective truck bed tarp for a pickup truck that has a housing unit attached to the rear of the truck bed. In this regard, the present invention substantially fulfills this need.

SUMMARY OF THE INVENTION

The present invention provides an improved truck bed tarp and storing system. As such, the general purpose of the present invention, which will be described subsequently in greater detail, is to provide a new and improved truck bed tarp and storing system and method.

To attain this, the present invention essentially comprises a semicircular housing unit that has a flat bottom side and a top side with a hollow therebetween. The bottom side of the housing unit has a pair of brackets that extend. The brackets are coupled to a forward portion of a truck bed of a pickup truck with a nut and a bolt. The housing unit has a length and a front edge with a first slot. The first slot has a slot length equal to the length of the front edge of the housing unit. The front edge of the housing unit has a flexible blade attached. The blade is held within the slot and extends the length of the housing unit. Also, a roller mechanism is mounted within the hollow of the housing unit. The roller mechanism has a roller and an axle. The roller rotates the axle along a horizontal axis of the axle. The axle has a first end and a second end. The first end of the axle is positioned within a first side wall of the housing unit. The second end of the axle is positioned within a second side wall of the housing unit. Included is a flexible tarp that has a second end, a first end, and a middle portion. The first end of the tarp is attached to the roller of the roller mechanism within the housing unit. The second end of the tarp extends through the second slot and slightly beyond the flexible blade of the housing unit. The tarp has a length for extending over an open truck bed of a pickup truck. The middle portion of the tarp has a plurality of flexible rods that are positioned within layers of the tarp to give structural integrity to the tarp when it is positioned over the truck bed. Additionally, a high density spring is disposed about the axle and interior of the housing unit. One end of the spring is attached to the axle, while the other end of the spring is attached to the housing unit just above the slot. Lastly, the flexible tarp is deployed off the roller and from within the housing unit by pulling the second end of the tarp out and over the truck bed towards the tailgate of the truck. The tarp is evenly feed over the truck bed to cover the truck bed. The tarp is attached to a pair of top edges of a pair of side walls of the truck bed by a plurality of hook and pile type fastener assemblies. A plurality of hook and pile type fastener assemblies are attached to a bottom surface of the tarp along side edges of the tarp. The plurality of hook and pile type fastener assemblies of the tarp are coupled to a coupling component of the hook and pile type fastener assemblies that are attached to each top edge of the truck bed.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Even still another object of the present invention is to provide a truck bed tarp and storing system for providing a protective truck bed tarp for a pickup truck that has a housing unit attached to the rear of the truck bed.

Lastly, it is an object of the present invention to provide a new and improved truck bed tarp and storing system including a housing unit that has a bottom side, a top side, a front edge with a slot, and a hollow between the two. The bottom side of the housing unit has a pair of brackets that are coupled to a forward portion of a truck bed of a pickup truck. Also, a roller mechanism is mounted within the hollow of the housing unit. The roller mechanism has a roller and an axle. Included is a tarp that has a first end attached to the roller. The tarp has a second end that extends through the second slot and a middle portion. A spring is disposed about the axle and interior of the housing unit. Lastly, the tarp is deployed off the roller within the housing by pulling the second end of the tarp out and over the truck bed. The tarp is secured to a pair of side walls of the truck.

These together with other objects of the invention, along with the various features of novelty which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the truck bed tarp and storing system constructed in accordance with the principles of the present invention.

FIG. 2 is an enlarged view of a component of the present invention taken at detail 2 of the FIG. 1.

FIG. 5 is a frontal view of the present invention prior to attachment to the truck bed.

FIG. 6 is a side view of the housing unit of the present invention.

FIG. 7 is a cross sectional view of the operable components of the present invention taken along line 7—7 of FIG. 4.

FIG. 8 is a cross sectional side view of the present invention taken along line 8—8 of FIG. 3.

The same reference numerals refer to the same parts through the various Figures.

DESCRIPTION OF THE PREFERRED EMBODIMENT

Figure 3:
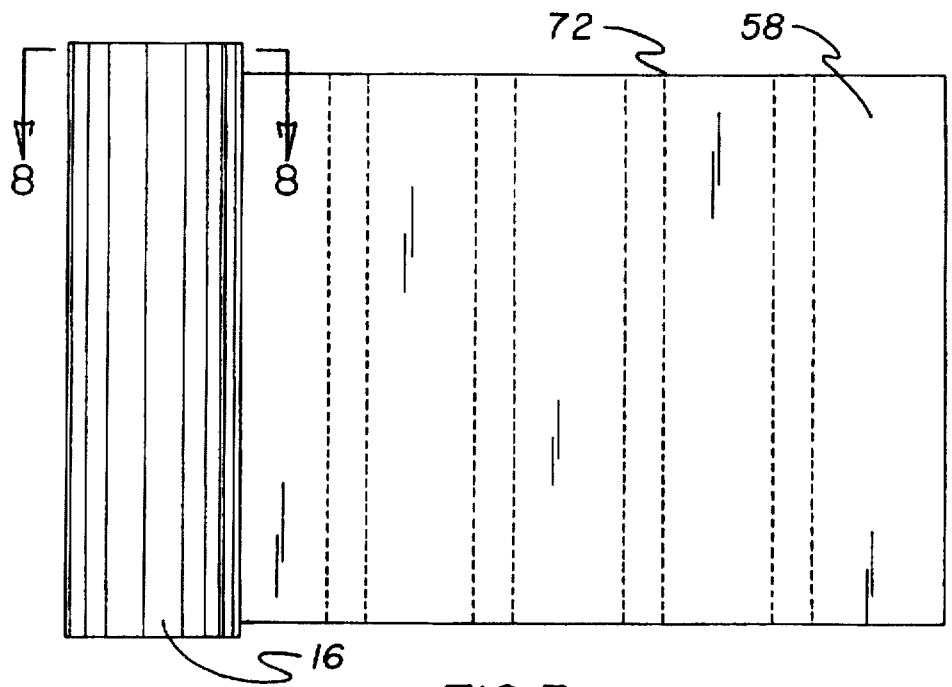
FIG. 3 is a top plan view of the present invention.

With reference now to the drawings, and in particular to FIG. 1 thereof, the preferred embodiment of the new and improved truck bed tarp and storing system embodying the principles and concepts of the present invention and generally designated by the reference numeral 10 will be described.

The present invention, the truck bed tarp and storing system 10 is comprised of a plurality of components. Such components in their broadest context include a housing unit, a roller mechanism, a tarp, and a spring. Such components are individually configured and correlated with respect to each other so as to attain the desired objective.

Figure 4:
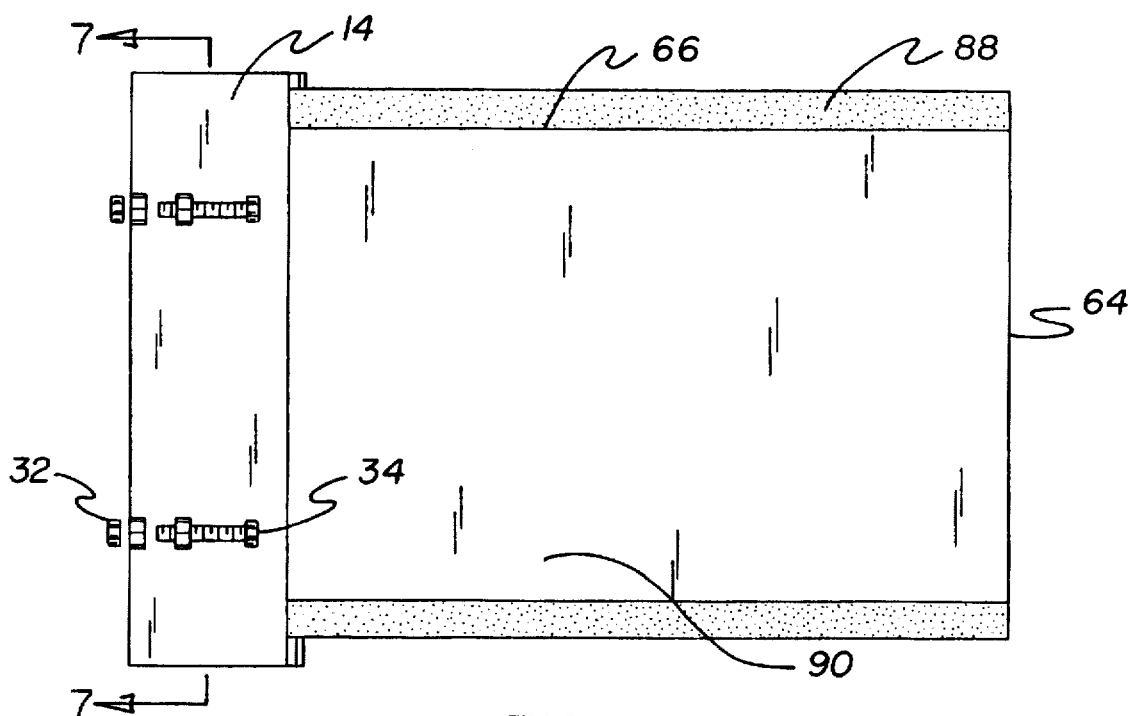
FIG. 4 is a bottom plan view of the present invention.

Specifically, the present invention includes a semicircular housing unit 12. The housing unit has a flat bottom 14 side and a top side 16 with a hollow 18 therebetween. The housing unit is formed of an aluminum material. The housing unit may be painted. The bottom side of the housing unit has a pair of brackets 22 that extend downwardly therefrom, as shown in FIG. 4. The brackets may be coupled to the rear portion 24 of the truck cab (this being the same as the forward portion of the opened truck bed 26) with a nut 32 and a bolt 34. Positioning of the housing unit on the truck bed is best illustrated in FIG. 1. The housing unit has a length and a front edge 38 with a first slot 40. The first slot has a slot length that is equal to the length of the front edge. The front edge of the housing unit has a flexible blade 42 attached. The blade is held within the first slot and extends the length of the housing unit. FIG. 8 depicts the first slot having the flexible blade coupled within.

As best illustrated in FIG. 7, a roller mechanism is mounted within the hollow 18 of the housing unit 12. The roller mechanism has a roller 46 and an axle 48. The roller is capable of rotating the axle along a horizontal axis. The axle has a first end 52 and a second end 54. The first end of the axle is positioned within a first side wall of the housing unit. The second end of the axle is positioned within a second side wall of the housing unit. The axle is capable of rotating freely within the side walls of the housing unit.

Included is a flexible tarp 58. The tarp, as shown in FIG. 4 has a first end 62, a second end 64, and a middle portion 66. The tarp is formed of a thin two-ply vinyl material. The first end, as shown in FIG. 6, of the tarp is attached to the roller 46 of the roller mechanism within the housing unit 12. The second end of the tarp extends through the second slot 68 and slightly beyond the flexible blade 42 of the housing unit. The second slot, as illustrated in FIG. 8 is adjacent the flat bottom side of the housing unit. Also, the second slot is just below the first slot 40 that is coupled with the flexible blade. The tarp has a length for extending over the open truck bed 26 of a pickup truck. The middle portion 66 of the tarp has a plurality of flexible rods 72. FIG. 3 shows the rods as flat and positioned within layers of the tarp for giving structural integrity to the tarp when it is positioned over the truck bed.

A high density spring 74 is provided. The spring is disposed about the axle 48 and interior the housing unit 12. One end 78 of the spring 74, as shown in FIG. 8 is attached to the axle. The other end 80 of the spring 74 is attached to the housing unit just above the slot of the flexible blade. The spring is a coil spring that operates similar to the spring contained within a watch or clock.

Furthermore, the flexible tarp 58 is deployed off the roller 46 from within the housing unit by a pulling motion. Pulling the second end 64 of the tarp out and over the truck bed will cause the spring 74 to tighten. The tarp is evenly fed over the truck bed 26 to cover the truck bed. The tarp is attached to a pair of top edges 84 of a pair of side walls 86 of the truck bed by a plurality of hook and pile type fastener assemblies 88. The plurality of hook and pile type fastener assemblies are attached to a bottom surface 90 of the tarp along side edges 92 of the tarp. FIG. 2 shows one of the fastener assemblies attached to the bottom surface of the tarp. A plurality of coupling components 94, as shown in FIG. 2, of the hook and pile type fastener assemblies are attached to each top edge 84 of the truck bed 12.

The tarp, once released from the top edges by uncoupling the hook and pile type fasteners, may be wound back into the housing. Rewinding of the tarp back into the housing unit occurs by making use of the torsional energy stored in the spring when the tarp was pulled out from the housing unit.

The present invention is a truck bed tarp and storing system that can be used on a pickup truck having an open truck bed. A housing unit containing a roller mechanism is attached to the rear portion of the truck bed of the truck with nuts and bolts. Once the housing unit is in place, a second end of the tarp, that extends from the housing unit, may be pulled toward the tailgate portion of the truck bed. The roller mechanism of the housing is attached to a spring that tightens as the tarp is pulled out from the housing unit. The tarp is long enough to extend all the way to the tailgate of the truck bed and is attached to the top portion or top edge of the truck bed with hook and pile type fasteners. The present invention is very easy to use and saves time. Pickup truck owners may quickly cover the open truck bed of their pickup truck.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function, and manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes thereof will readily occur to those skilled in the art, it is not desired to limit the invention to the exact construction and operation shown and described, and accordingly, all suitable modifications and equivalents may be resorted to, falling within the scope of the invention.

I claim as being new and desired to be protected by Letters Patent of the United States:

1. A truck bed tarp and storing system for use on a pickup truck having an open truck bed comprising in combination:

a semicircular housing unit having a flat bottom side and a top side with a hollow therebetween, the bottom side of the housing unit having a pair of brackets extending therefrom, the brackets being capable of being coupled to a forward end of the open truck bed of the pickup truck with a nut and a bolt, the housing unit having a length, a front edge with a first slot, and a second slot, the first slot having a slot length equal to the length, the front edge of the housing unit having a flexible blade attached thereto, the blade being held within the first slot and extending the length of the housing unit;

a roller mechanism being mounted within the hollow of the housing unit, the roller mechanism having a roller and an axle, the roller being capable of rotating the axle about a horizontal axis, the axle having a first end and a second end, the first end of the axle being positionable within a first side wall of the housing unit, the second end of the axle being positionable within a second side wall of the housing unit;

a flexible tarp having a first end, a second end, and a middle portion therebetween, the first end of the tarp being attached to the roller of the roller mechanism within the housing unit, the second end of the tarp extending through the second slot of the housing unit and slightly beyond the flexible blade of the housing unit, the tarp having a length for extending over the open truck bed of the pickup truck, the middle portion of the tarp having a plurality of flexible rods being positioned within layers of the tarp for giving structural integrity to the tarp when being positioned over the truck bed;

a high density spring being disposed about the axle and within the hollow of the housing unit, one end of the spring being attached to the axle, another end of the spring being attached to an interior surface of the housing unit just above the first slot for the flexible blade; and a plurality of pile-type fastener assemblies being attached to a bottom surface of the tarp along side edges of the tarp, and a coupling component of the pile-type fastener assemblies being attached to a pair of top edges of a pair of side walls of the truck bed, the flexible tarp being capable of being deployed off the roller and from within the housing unit, by pulling the second end of the tarp out through the second slot and over the open truck bed, the tarp being evenly fed over the open truck bed to cover the open truck bed, the tarp being attached to the pair of top edges of the pair of side walls of the open truck bed by the plurality of pile-type fastener assemblies.

2. A truck bed tarp and storing system comprising:

a housing unit having a bottom side, a top side, a hollow therebetween, a front edge with a first slot, and a second slot, the bottom side of the housing unit having a pair of brackets capable of being coupled to a forward portion of a truck bed of a pickup truck;

a roller mechanism mounted within the hollow of the housing unit, and having a roller and an axle;

a tarp having a first end being attached to the roller, a second end extending through the second slot, and a middle portion therebetween; and a spring being disposed about the axle and within the hollow of the housing unit;

the tarp being capable of being deployed off the roller within the housing unit by pulling the second end of the tarp out through the second slot and over the truck bed, and being secured to a pair of side walls of the truck bed.

3. The truck bed tarp and storing system as set forth in claim 2 wherein the housing unit has a length and the first slot has a slot length equal to a length of the front edge along the housing unit, the front edge having a flexible blade attached to and being capable of covering the first slot and extending the length of the housing unit.

4. The truck bed tarp and storing system as set forth in claim 3 wherein the second end of the tarp when positioned through the second slot extends slightly beyond the flexible blade of the housing unit.

5. The truck bed tarp and storing system as set forth in claim 2 wherein the bottom side of the housing unit is flat and the brackets extend downwardly therefrom, the brackets being coupled to the truck bed with a nut and a bolt.

6. The truck bed tarp and storing system as set forth in claim 2 wherein the roller is capable of rotating the axle about a horizontal axis, the axle having a first end being positioned within a first side wall of the housing unit and a second end being positionable within a second side wall of the housing unit.

7. The truck bed tarp and storing system as set forth in claim 2 wherein the tarp has a length for extending and being deployed over the truck bed of the pickup truck, and the middle portion of the tarp has a plurality of flexible rods being positioned within layers of the tarp for giving structural integrity thereto.

8. The truck bed tarp and storing system as set forth in claim 2 wherein the spring is a high density spring with one end of the spring being attached to the axle, and another end of the spring being attached to an interior surface of the housing unit.

9. The truck bed tarp and storing system as set forth in claim 2 wherein the tarp has a plurality of pile-type fastener assemblies being attached to a bottom surface of the tarp along side edges of the tarp for coupling to a plurality of pile-type fastener assemblies being attached to top edges of the pair of side walls of the truck bed, and the pile-type fasteners are coupled when the tarp is evenly fed over the truck bed for covering.

* * * * *